United States Patent
Sisco et al.

(10) Patent No.: US 9,566,676 B2
(45) Date of Patent: Feb. 14, 2017

(54) SYSTEM AND METHOD FOR MANUFACTURING A WING PANEL

(71) Applicant: The Boeing Company, Chicago, IL (US)

(72) Inventors: Farahnaz Tanni Sisco, Mukilteo, WA (US); Daniel R. Smith, Redmond, WA (US); Jayson J. Aquino, Bothell, WA (US); Edward John Batt, Bothell, WA (US); James N. Buttrick, Seattle, WA (US); Antonio C. Micale, Seattle, WA (US); Darrell D. Jones, Mill Creek, WA (US); Clayton L. Munk, Maple Valley, WA (US); Chris G. Couevas, Bothell, WA (US); Mario Ramos, Tacoma, WA (US); Azita N. Namdaran, Bellevue, WA (US); Noman S. Noor, Bellevue, WA (US); Donald A. Mottaz, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 13/837,750

(22) Filed: Mar. 15, 2013

(65) Prior Publication Data

US 2014/0090252 A1    Apr. 3, 2014

Related U.S. Application Data

(60) Provisional application No. 61/707,360, filed on Sep. 28, 2012.

(51) Int. Cl.
*B23P 19/04* (2006.01)
*B64C 3/00* (2006.01)
(Continued)

(52) U.S. Cl.
CPC .............. *B23P 23/00* (2013.01); *B21J 15/142* (2013.01); *B23P 23/06* (2013.01); *B64F 5/0009* (2013.01);
(Continued)

(58) Field of Classification Search
CPC ........... B21J 15/10; B21J 15/14; B21J 15/142; B23P 19/04; B23P 21/002; B23P 21/00; B23P 21/004; B23P 23/00; B23P 23/06; B23P 2700/01; B64F 5/0036; B64F 5/0009; Y10T 29/49622; Y10T 29/51
See application file for complete search history.

(56) References Cited

U.S. PATENT DOCUMENTS 1,320,740 A * 11/1919 Coghlin ................ B61B 10/025
                                                     104/111
5,088,610 A *  2/1992 Garnier ...................... B25J 5/00
                                                     212/196

(Continued)

FOREIGN PATENT DOCUMENTS

| EP | 1 129 787 A2 | 9/2011 |
|---|---|---|
| WO | WO-97/34734 A1 | 9/1997 |
| WO | WO 2013/041506 | 3/2013 |

OTHER PUBLICATIONS

International Search Report and Written Opinion for Application No. PCT/US2013/054899; dated Dec. 6, 2013.

(Continued)

*Primary Examiner* — David Bryant
*Assistant Examiner* — Jun Yoo
(74) *Attorney, Agent, or Firm* — Alston & Bird LLP

(57) ABSTRACT

A system and method are provided to automate the assembly of a wing panel, such as utilized by commercial aircraft. In the context of a system, a tacking cell is provided that is configured to tack one or more stringers to a skin plank. The system also includes a riveting cell configured to receive a (Continued)

tacked plank from the tacking cell and to rivet the one or more stringers to the skin plank. The system also includes a splicing cell configured to receive a plurality of riveted planks from the riveting cell and to attach one or more splice stringers to the plurality of riveted planks. Further, the system includes a side of body cell configured to receive a spliced panel from the splicing cell and to attach a side of body chord thereto to produce a wing panel.

17 Claims, 18 Drawing Sheets

(51) Int. Cl.
   *B23P 23/00*   (2006.01)
   *B21J 15/14*   (2006.01)
   *B64F 5/00*    (2006.01)
   *B23P 23/06*   (2006.01)

(52) U.S. Cl.
   CPC .......... *B64F 5/0036* (2013.01); *B23P 2700/01* (2013.01); *Y10T 29/49622* (2015.01); *Y10T 29/51* (2015.01)

(56) References Cited

U.S. PATENT DOCUMENTS

| | | |
|---|---|---|
| 5,560,102 A | 10/1996 | Micale et al. |
| 5,615,483 A | 4/1997 | Micale et al. |
| 6,003,812 A | 12/1999 | Micale et al. |
| 6,029,352 A | 2/2000 | Nelson |
| 6,170,157 B1 | 1/2001 | Munk et al. |
| 6,269,527 B1 | 8/2001 | Nelson |
| 6,779,272 B2 | 8/2004 | Day et al. |
| 7,628,358 B2 | 12/2009 | Ackermann et al. |
| 7,686,251 B2 | 3/2010 | Tanner et al. |
| 7,721,995 B2 | 5/2010 | Tanner et al. |
| 7,770,477 B2 | 8/2010 | Hazlehurst et al. |
| 2003/0030239 A1* | 2/2003 | Woerner ................ B62B 3/002 280/47.35 |
| 2003/0163928 A1* | 9/2003 | Kato ............................... 33/568 |
| 2005/0116105 A1* | 6/2005 | Munk et al. .................. 244/123 |
| 2007/0042126 A1 | 2/2007 | Passman et al. |
| 2008/0155807 A1 | 7/2008 | Toh et al. |
| 2010/0038024 A1 | 2/2010 | Brandt |
| 2011/0047791 A1 | 3/2011 | Ferenczi et al. |
| 2011/0091709 A1 | 4/2011 | Knepper et al. |
| 2014/0242417 A1 | 8/2014 | Kliemann et al. |

OTHER PUBLICATIONS

Office Action for Canadian Application No. 2,880,082 dated Nov. 30, 2015.

Examination Report for European Application No. GB1418477.4 dated Mar. 10, 2016.

\* cited by examiner

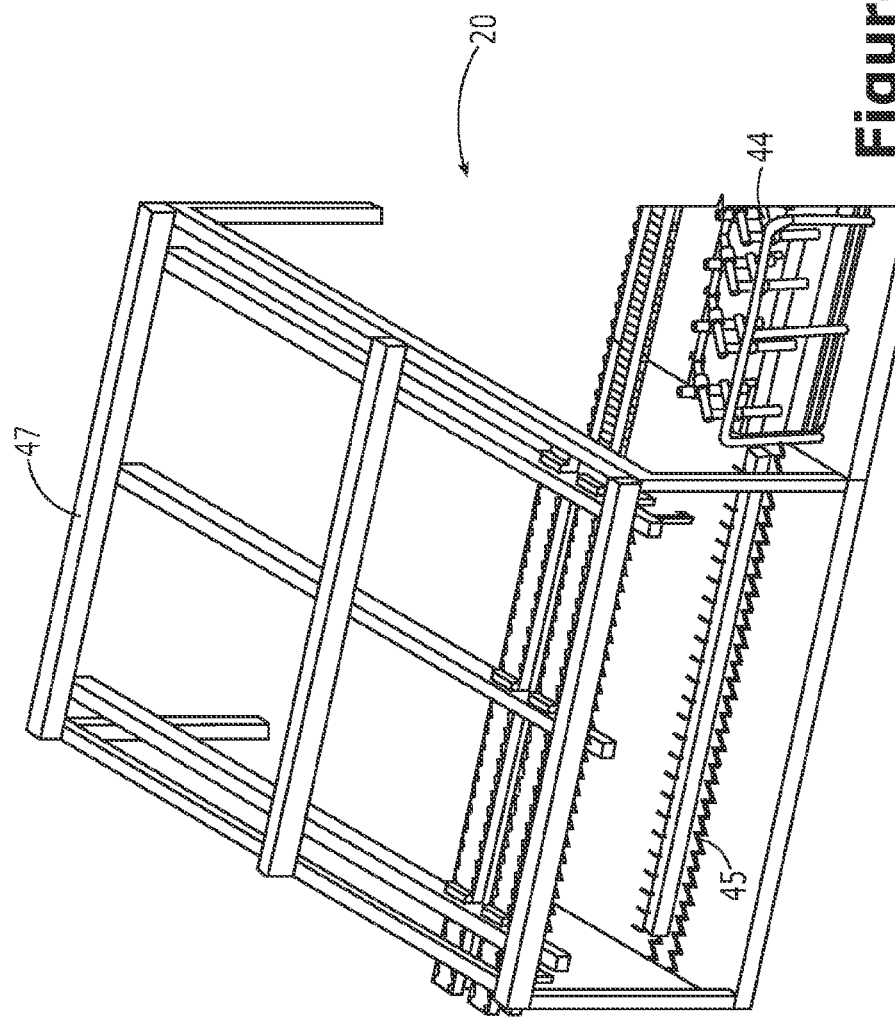

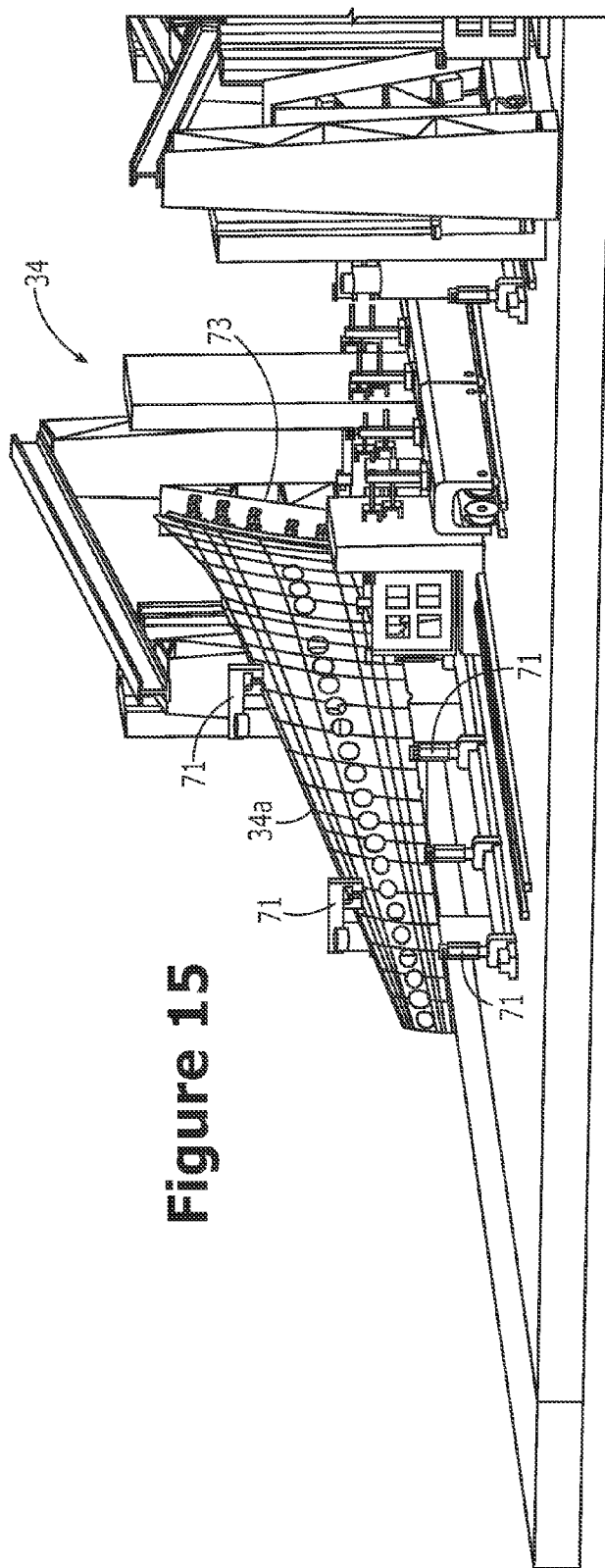

SYSTEM AND METHOD FOR MANUFACTURING A WING PANEL

CROSS REFERENCE TO RELATED APPLICATION

This application is a non-provisional of and claims priority to U.S. provisional patent application No. 61/707,360, filed Sep. 28, 2012, the entire contents of which are hereby incorporated by reference.

TECHNOLOGICAL FIELD

An example embodiment of the present disclosure relates generally to the manufacture of a wing panel and, more particularly, to the automated assembly of a wing skin planks to form a wing panel utilizing a sequential series of manufacturing cells.

BACKGROUND

In order to manufacture a wing panel, a plurality of stringers and a side of body chord are loaded into a fixture to maintain their relative positions. A plurality of wing skin planks are then positioned proximate the stringers and the side of body chord. Once properly positioned, the wing skin planks are clamped to the fixture and thereafter tacked to the stringers and the side of body chord so as to define either an upper wing panel or a lower wing panel. The resulting wing panel is then moved via a crane system to a riveting station that may employ, for example, one or more C-type Gemcor® riveting devices. The riveting devices then install rivets between the tack fasteners. For relatively large wing panels, five to seven riveting devices may be required with a dedicated operator required to operate each of the riveting devices. The tack fasteners that were previously installed are then either drilled out and replaced by traditional rivets at the riveting station or manually removed and replaced by bolts while the wing panel is stationed in a panel pickup area. The upper and lower wing panels may then be assembled to produce the resulting wing box.

The manufacturing process for producing a wing panel and, in turn, for assembling the wing panels to form a wing box requires substantial human involvement. As such, it may be challenging to increase the rate at which wing panels and, in turn, wing boxes are fabricated utilizing the conventional fabrication process.

BRIEF SUMMARY

A system and method are provided in accordance with an example embodiment in order to automate the assembly of a wing panel, such as utilized by commercial aircraft. In one embodiment, the method and system utilize a plurality of operationally separate cells, each of which performs a distinct operation in a largely, if not fully, automated manner. The operationally separate cells may be arranged in a sequential manner such that the work flow begins from a staging cell and then moves, in turn, to a tacking cell, a riveting cell, a splicing cell and a side of body cell. By automating the assembly process and by utilizing operationally separate cells for performing distinct manufacturing operations, the system and method of one embodiment may manufacture wing panels and, in turn, wing boxes more rapidly so as to enable the output to match increased demand.

In one embodiment, a system for automated manufacture of aircraft wing panels is provided that includes a tacking cell configured to tack one or more stringers to a skin plank and a riveting cell configured to receive a tacked plank from the tacking cell and to rivet the one or more stringers to the skin plank. The system of this embodiment also includes a splicing cell configured to receive a plurality of riveted planks from the riveting cell and to attach one or more splice stringers to the plurality of riveted planks. Further, the system of one embodiment also includes a side of body cell configured to receive a spliced panel from the splicing cell and to attach a side of body chord thereto to produce a wing panel.

In another embodiment, a method for automated manufacture of aircraft wing panels includes tacking one or more stringers to a skin plank in a tacking cell. The method of this embodiment also includes receiving a tacked plank from the tacking cell and riveting the one or more stringers to the skin plank in a riveting cell. The method of this embodiment also includes receiving a plurality of riveted planks from the riveting cell and attaching one or more splice stringers to the plurality of riveted planks in a splicing cell. Further, the method of this embodiment receives a spliced panel from the splicing cell and attaching a side of body chord thereto within a side of body cell to produce a wing panel.

BRIEF DESCRIPTION OF THE DRAWINGS

Figure 1:
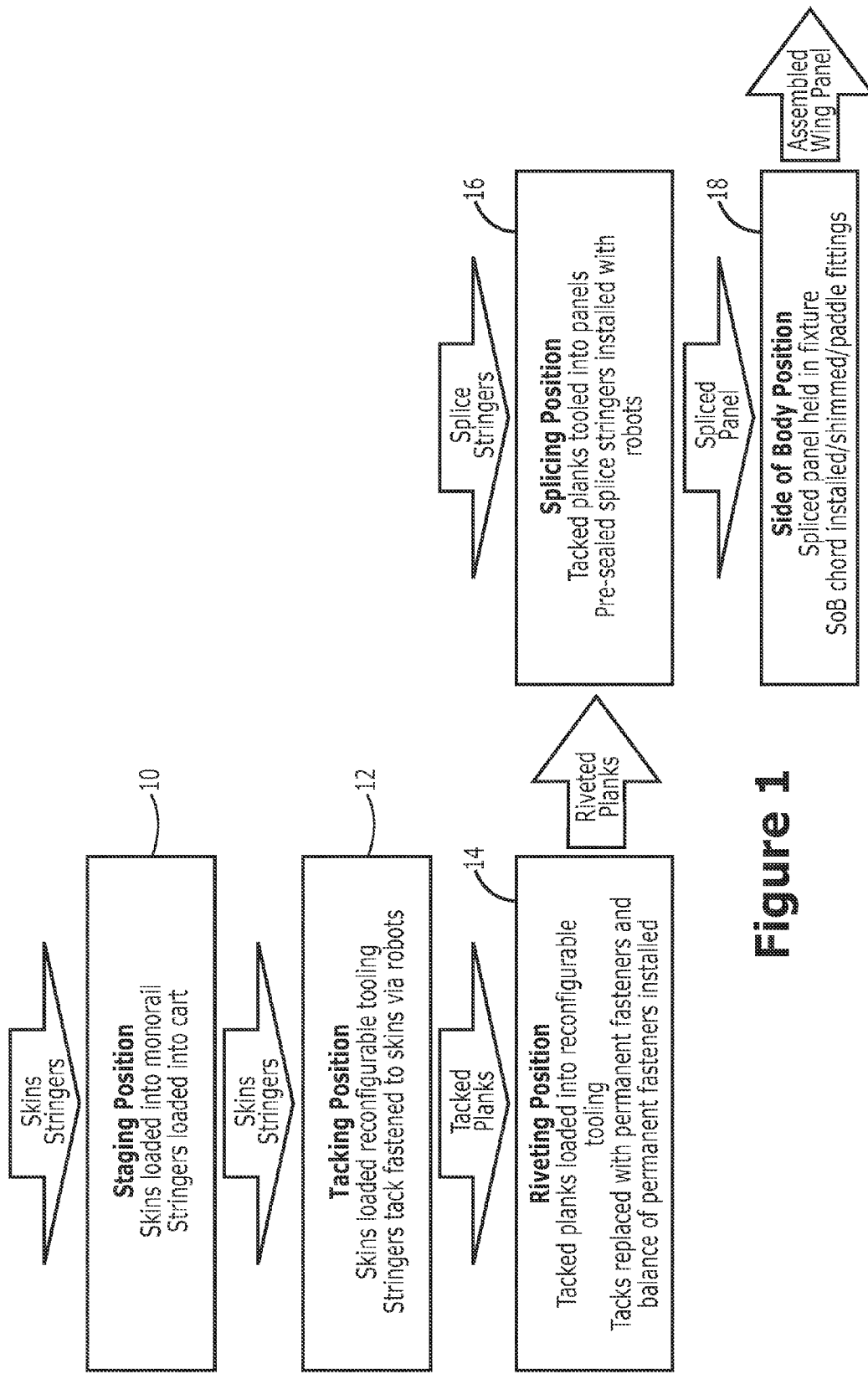
Figure 2:
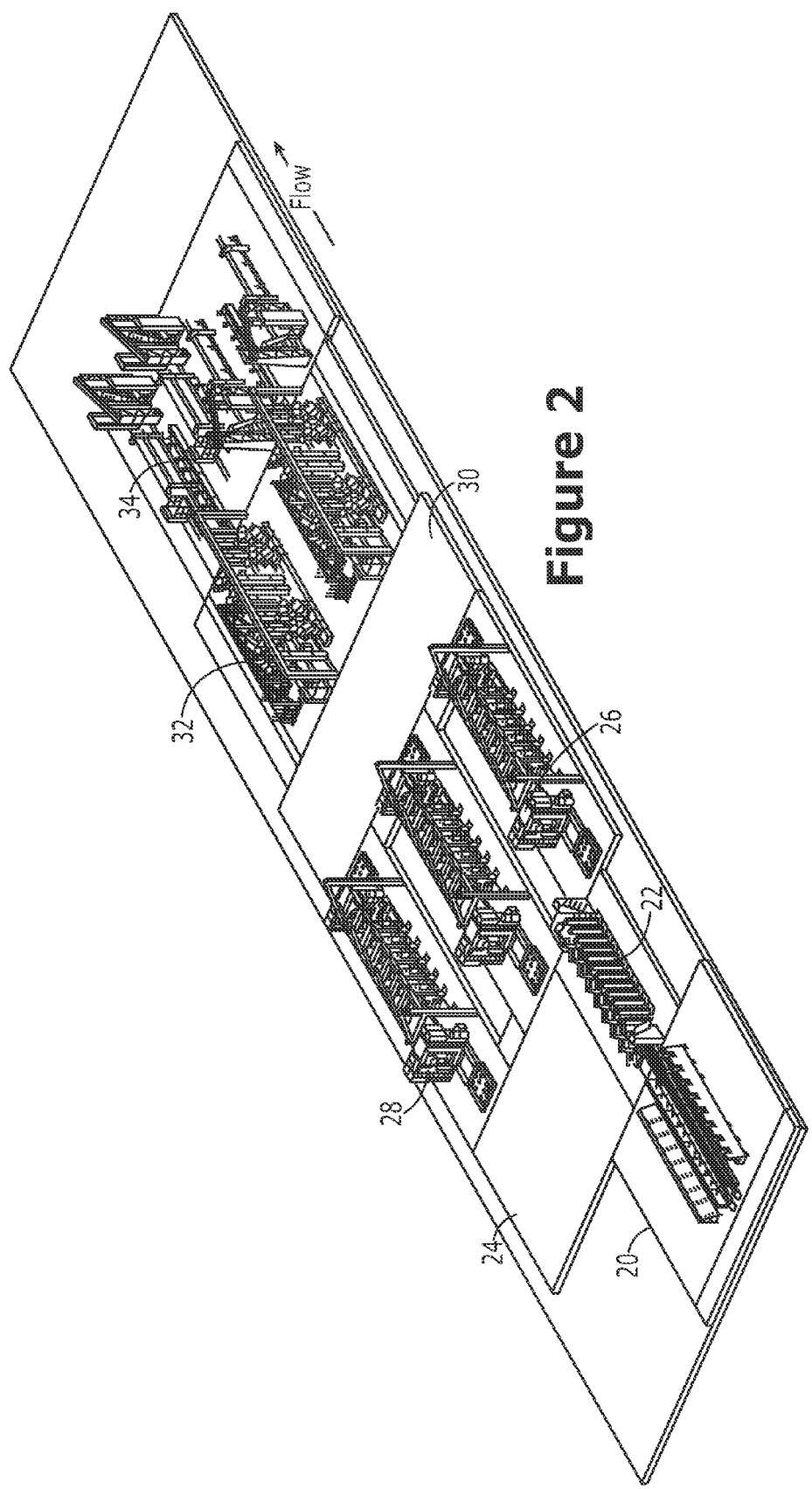
Figure 3A:
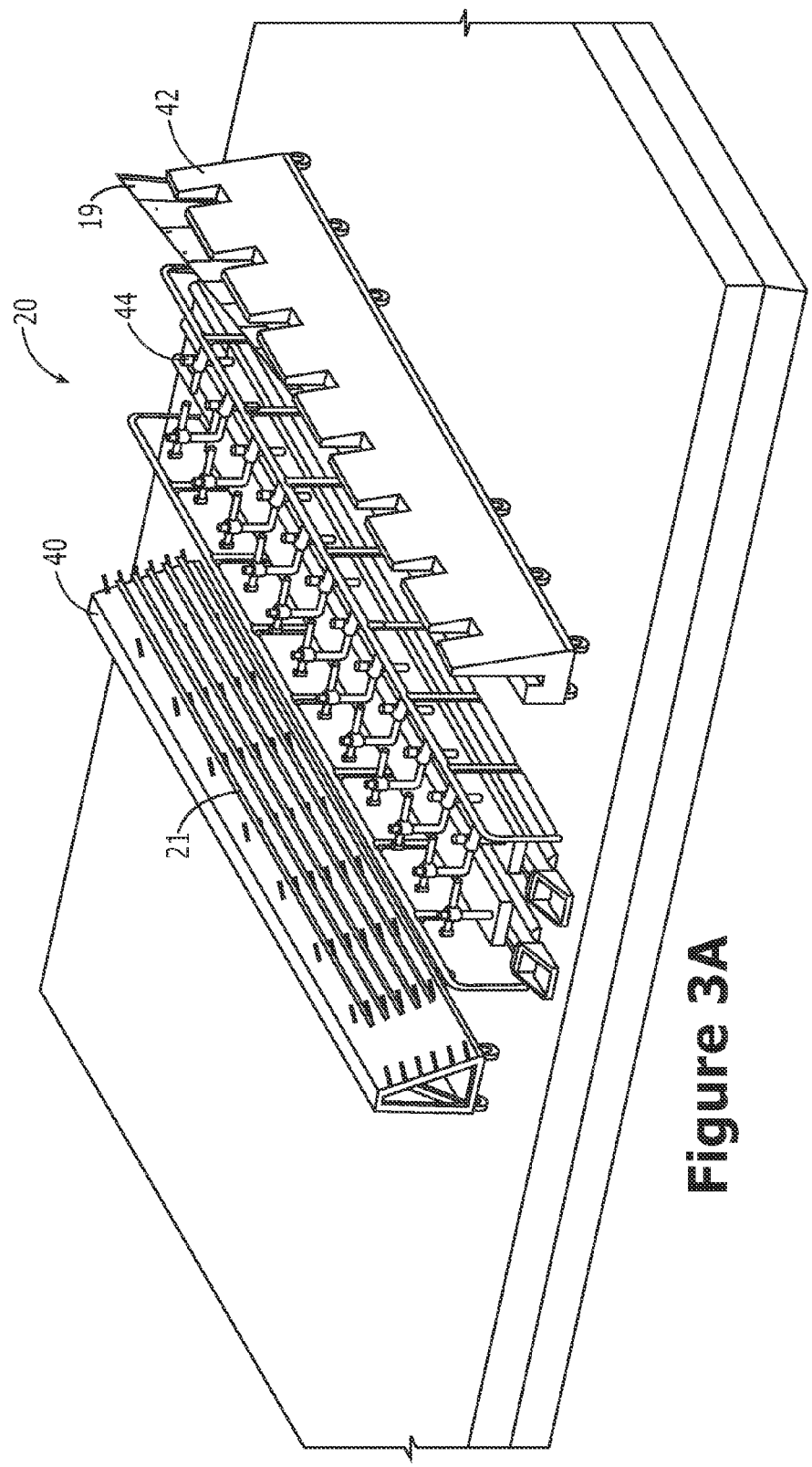
Figure 3B:
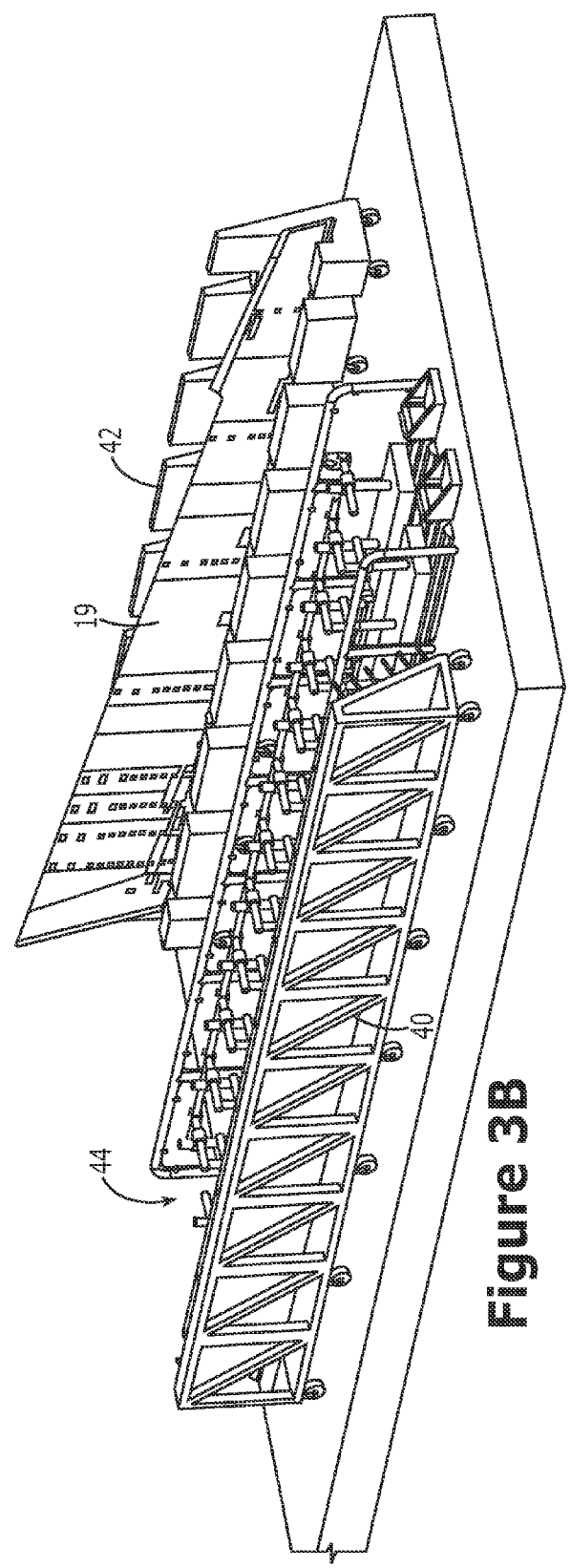
Figure 3C:
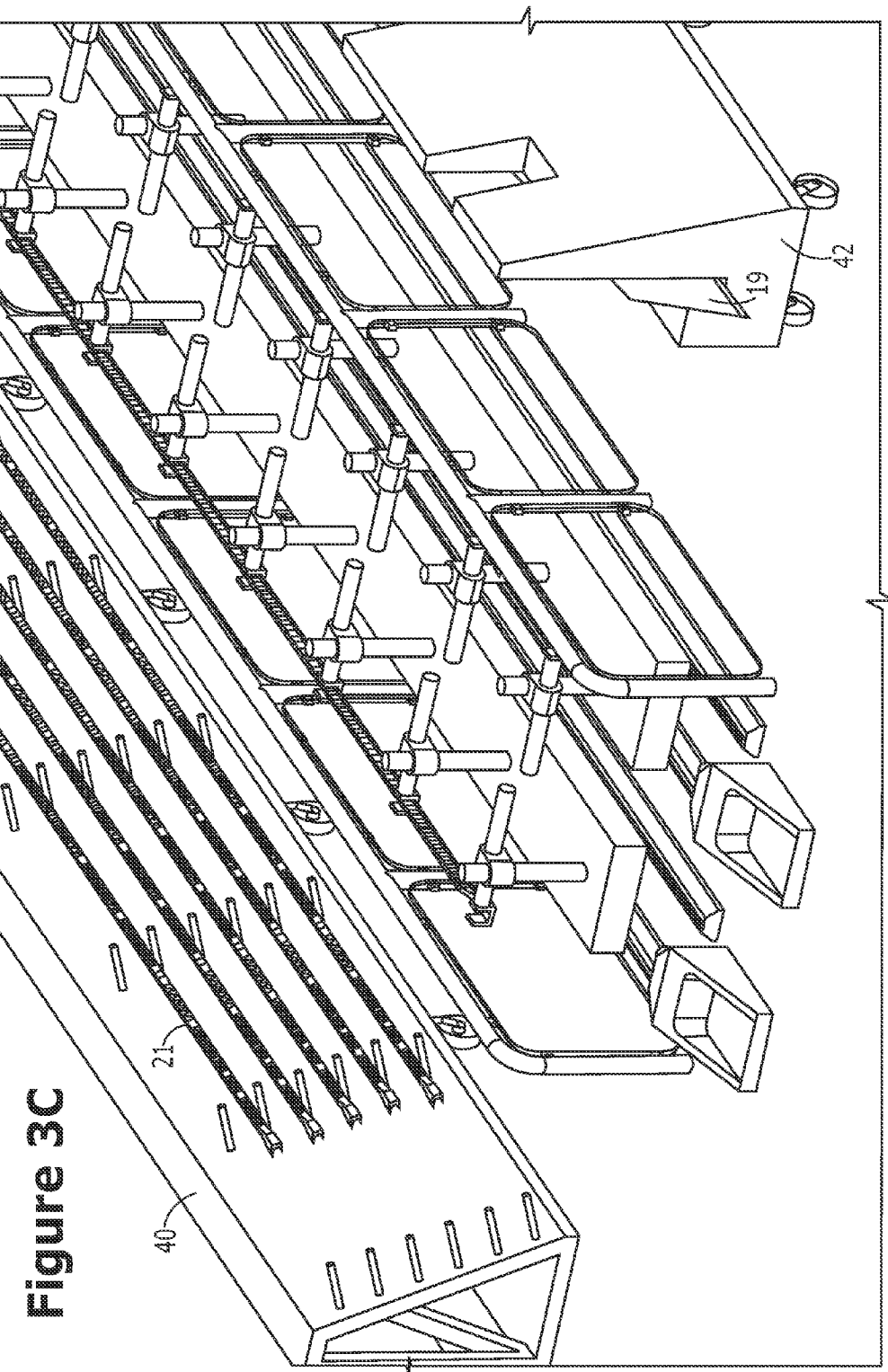
Figure 3D:
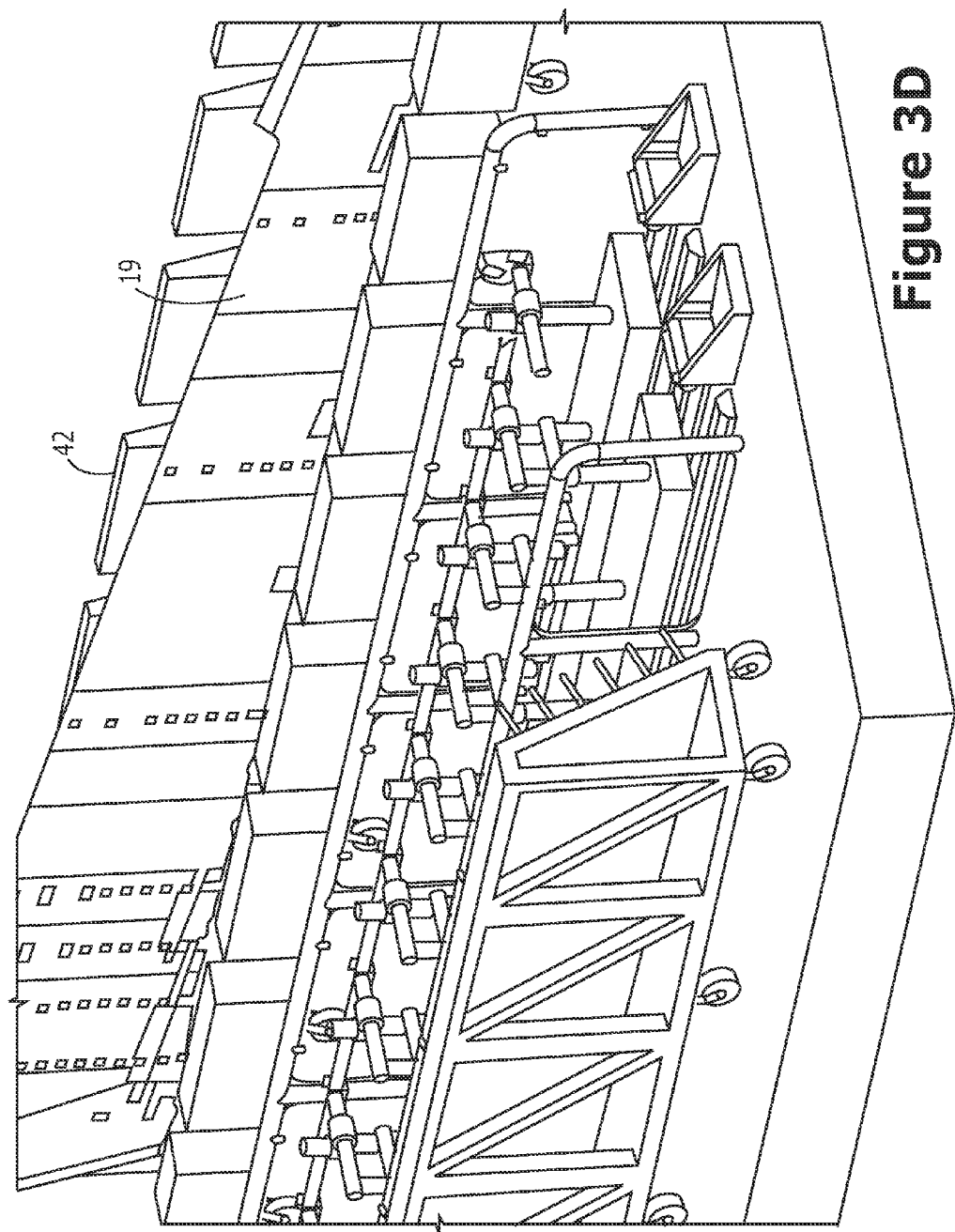
Figure 5:
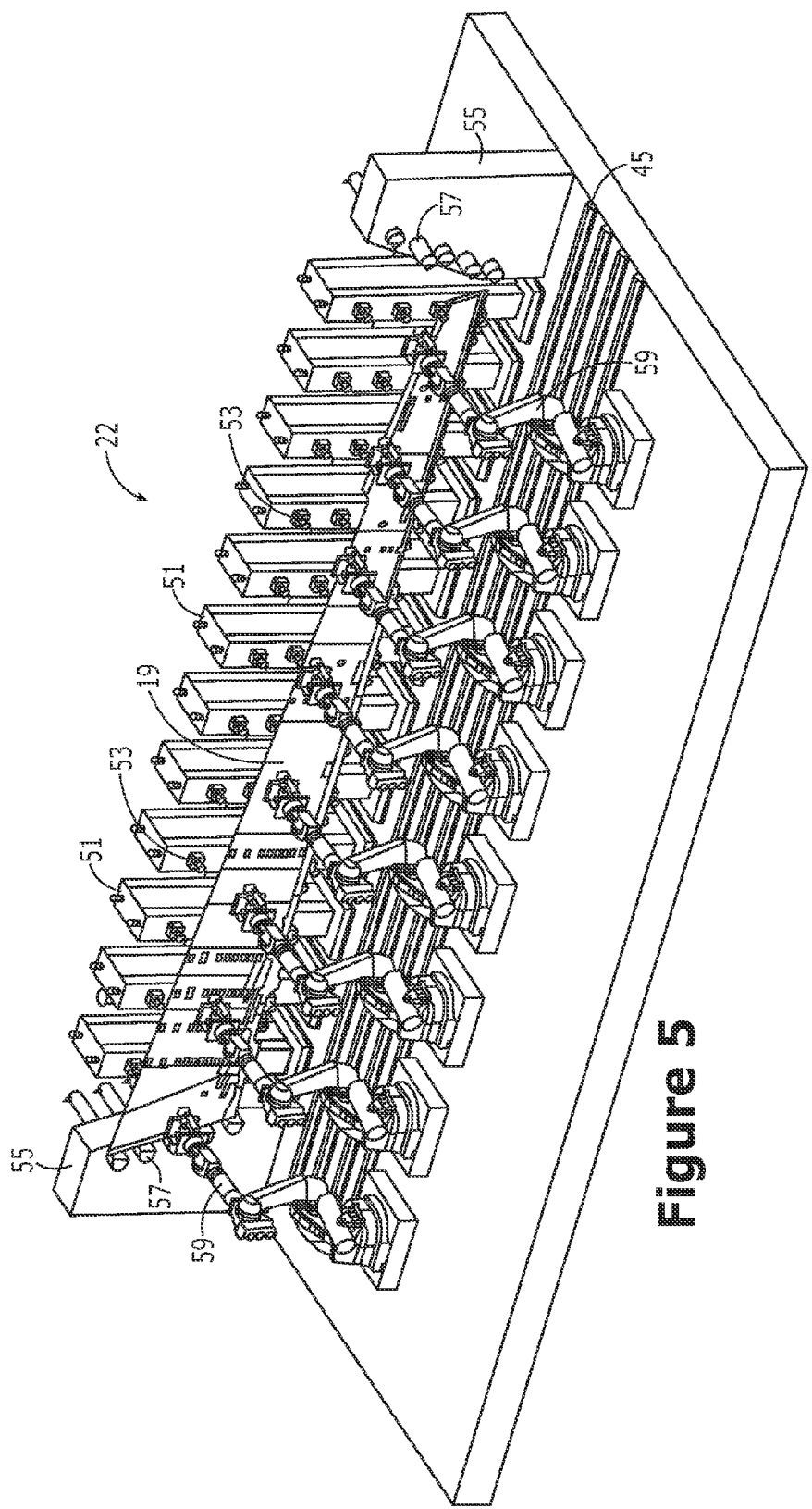
Figure 6:
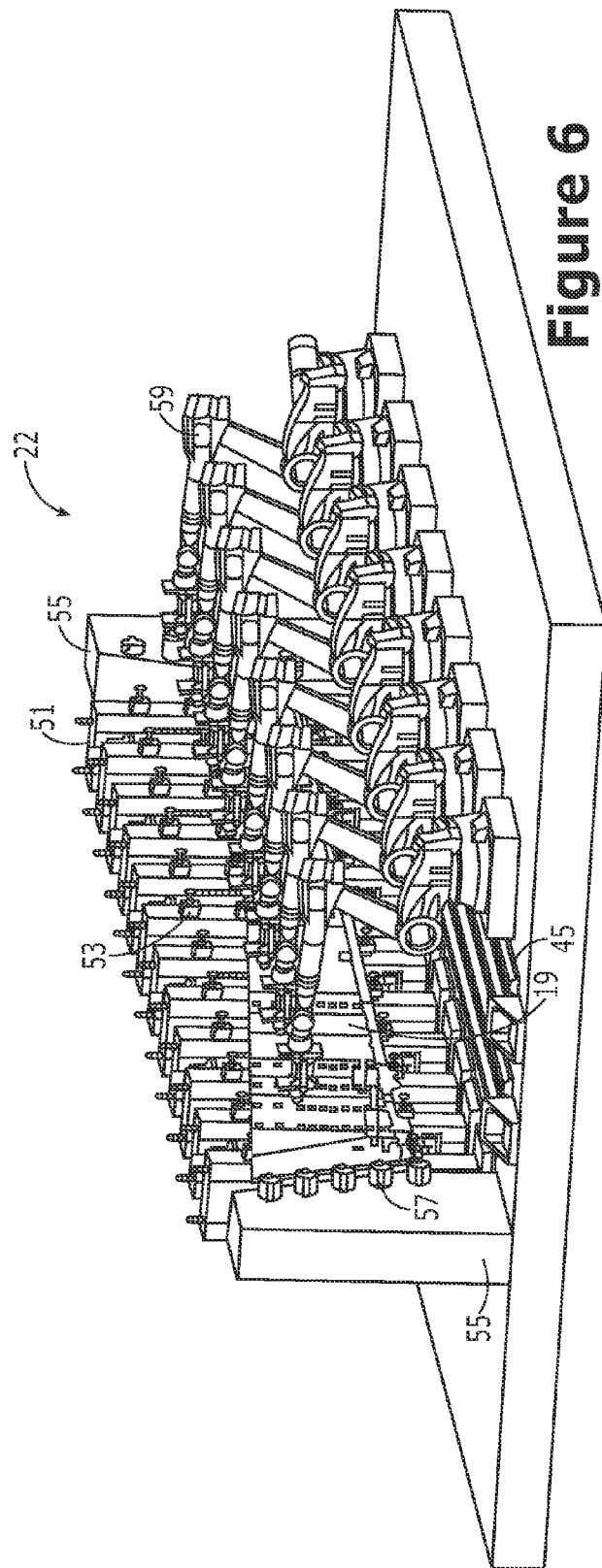
Figure 7:
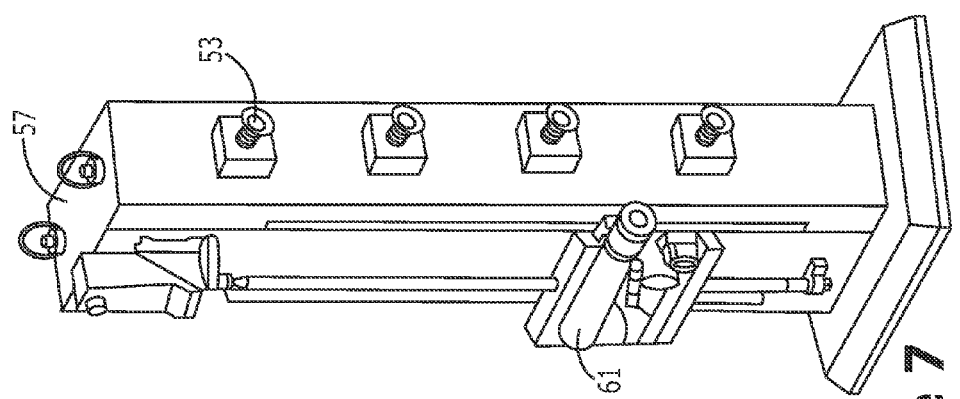
Figure 8:
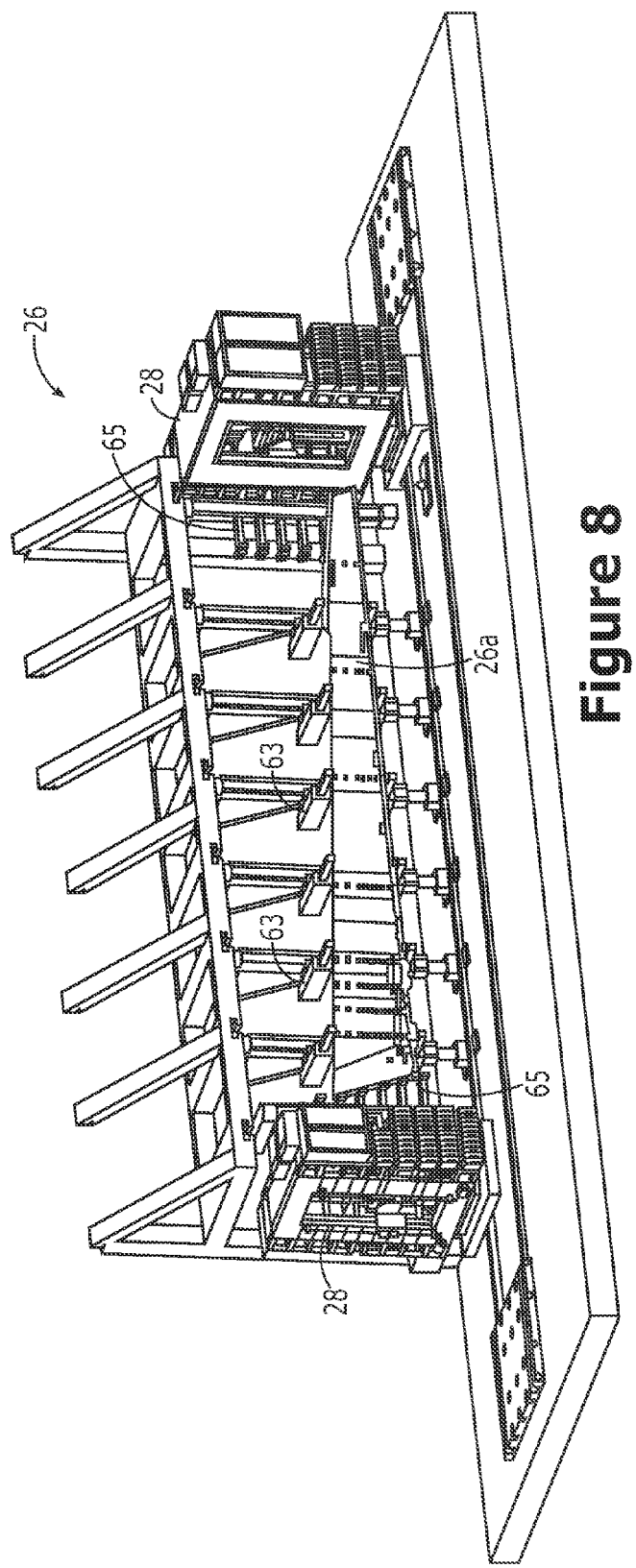
Figure 9:
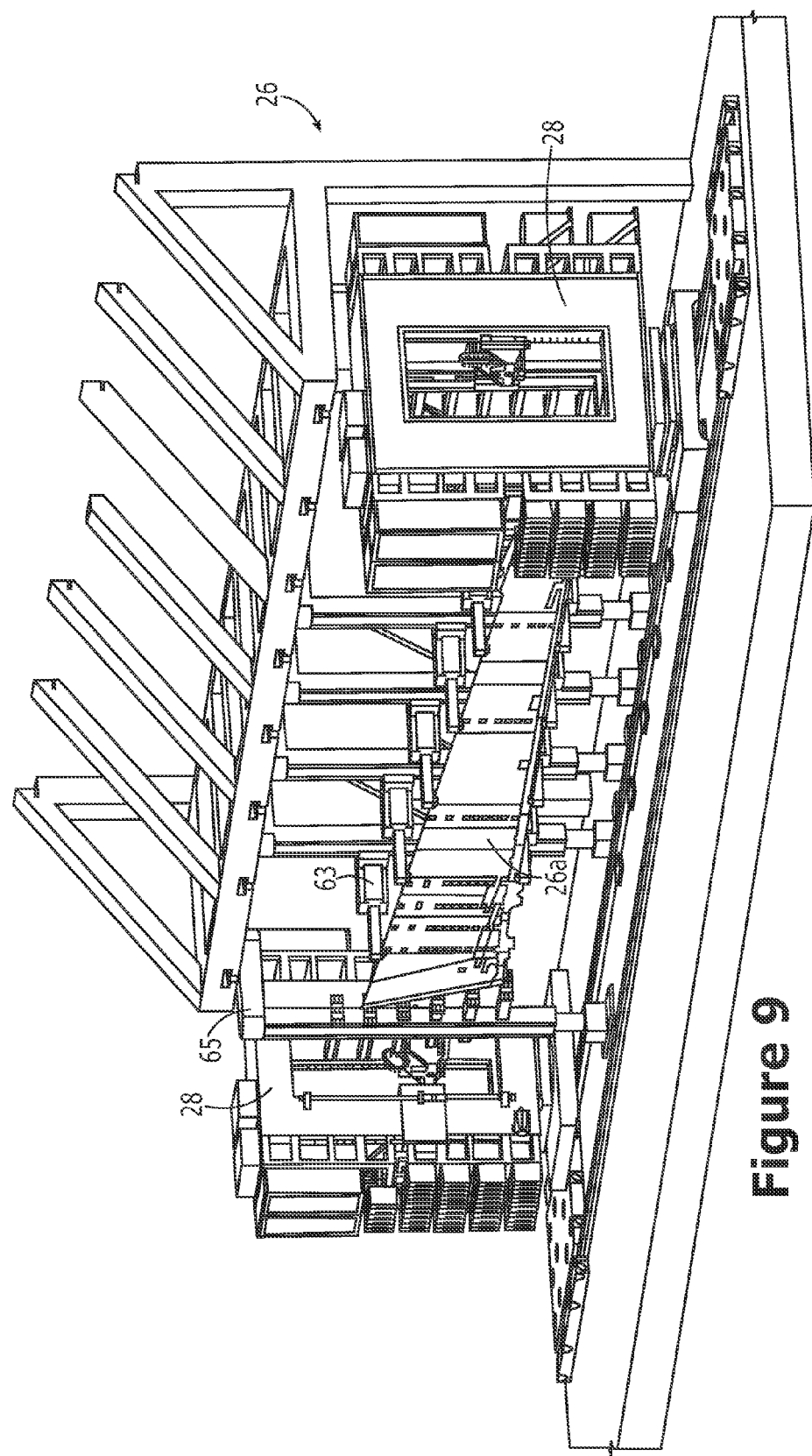
Figure 10:
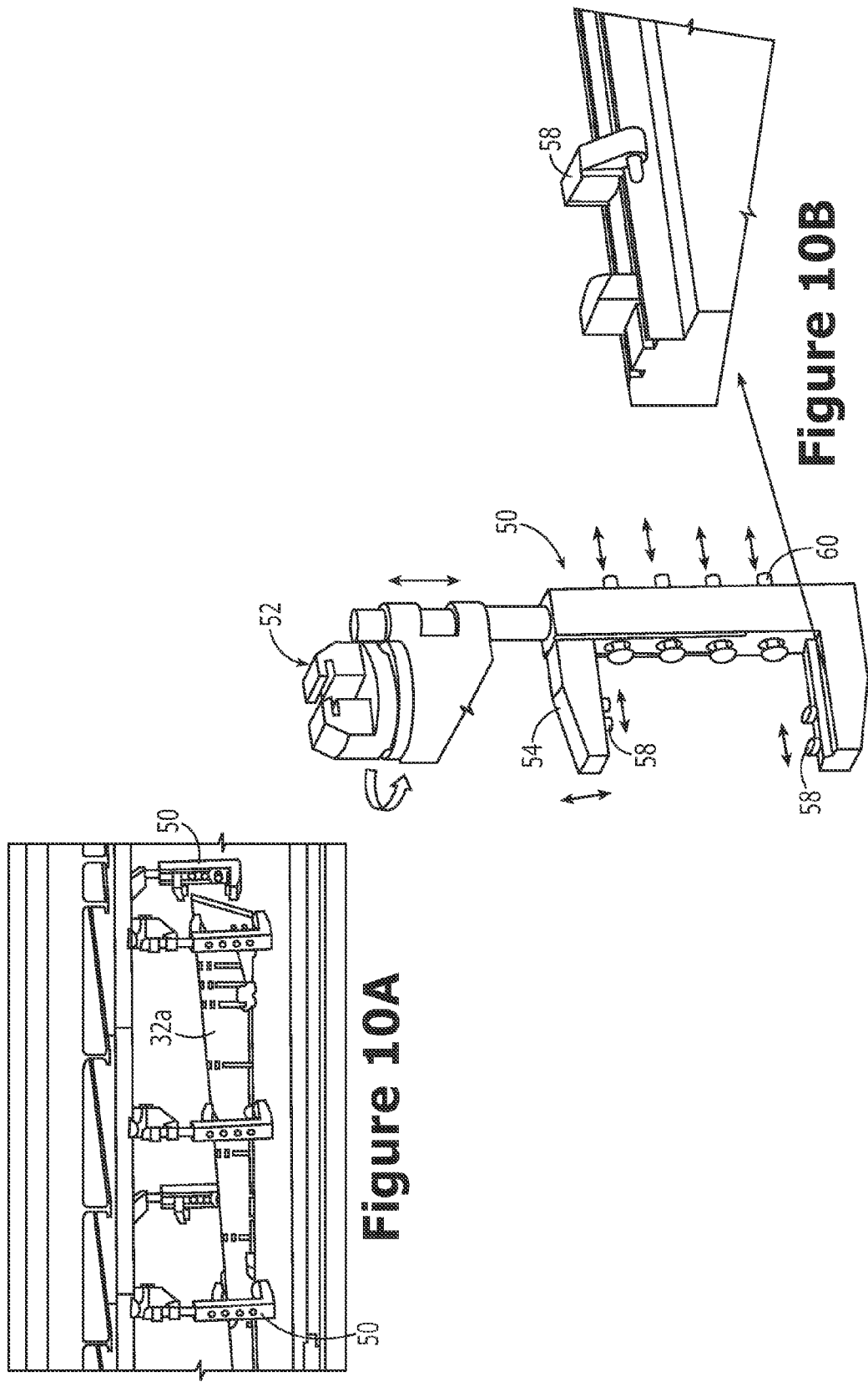
Figure 11:
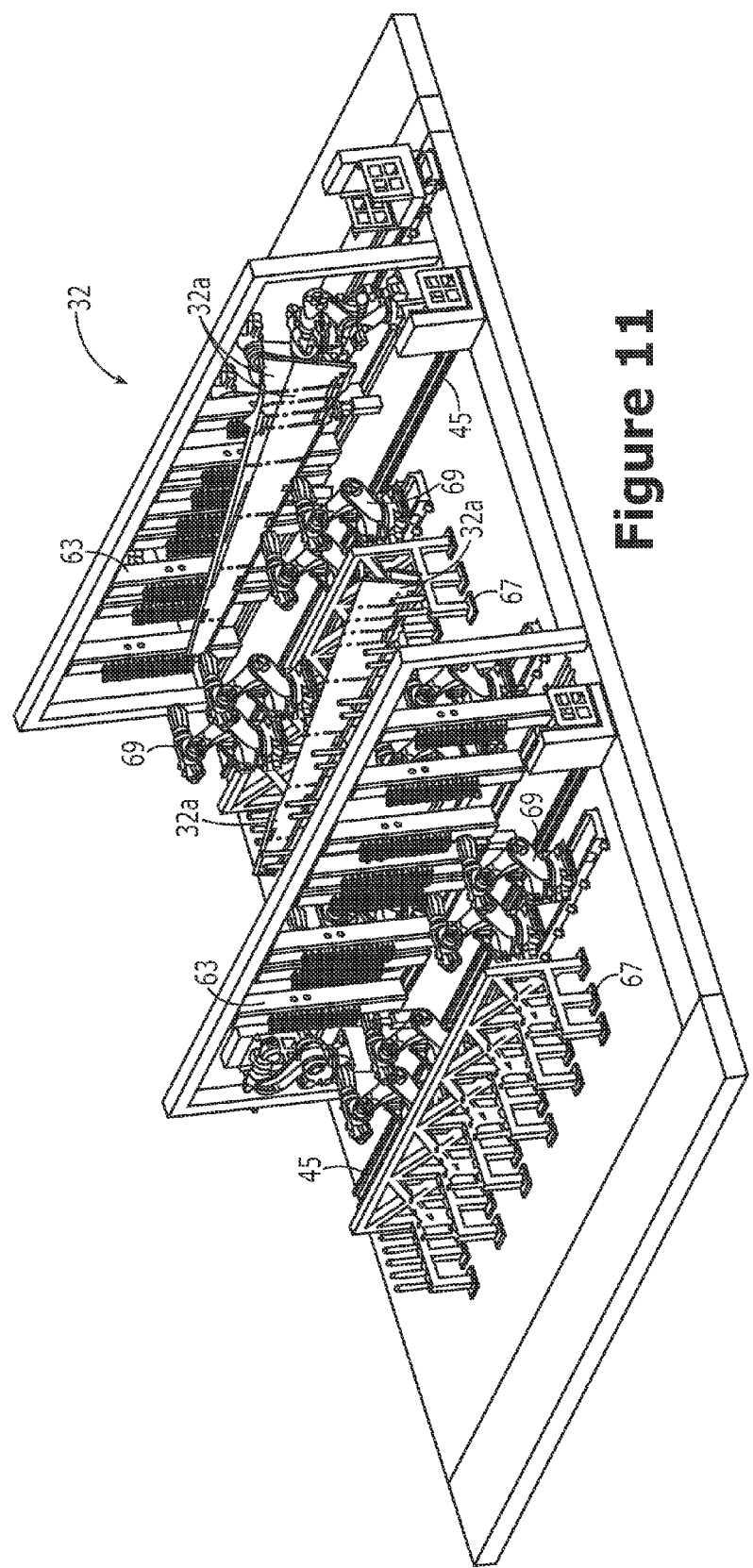
Figure 12:
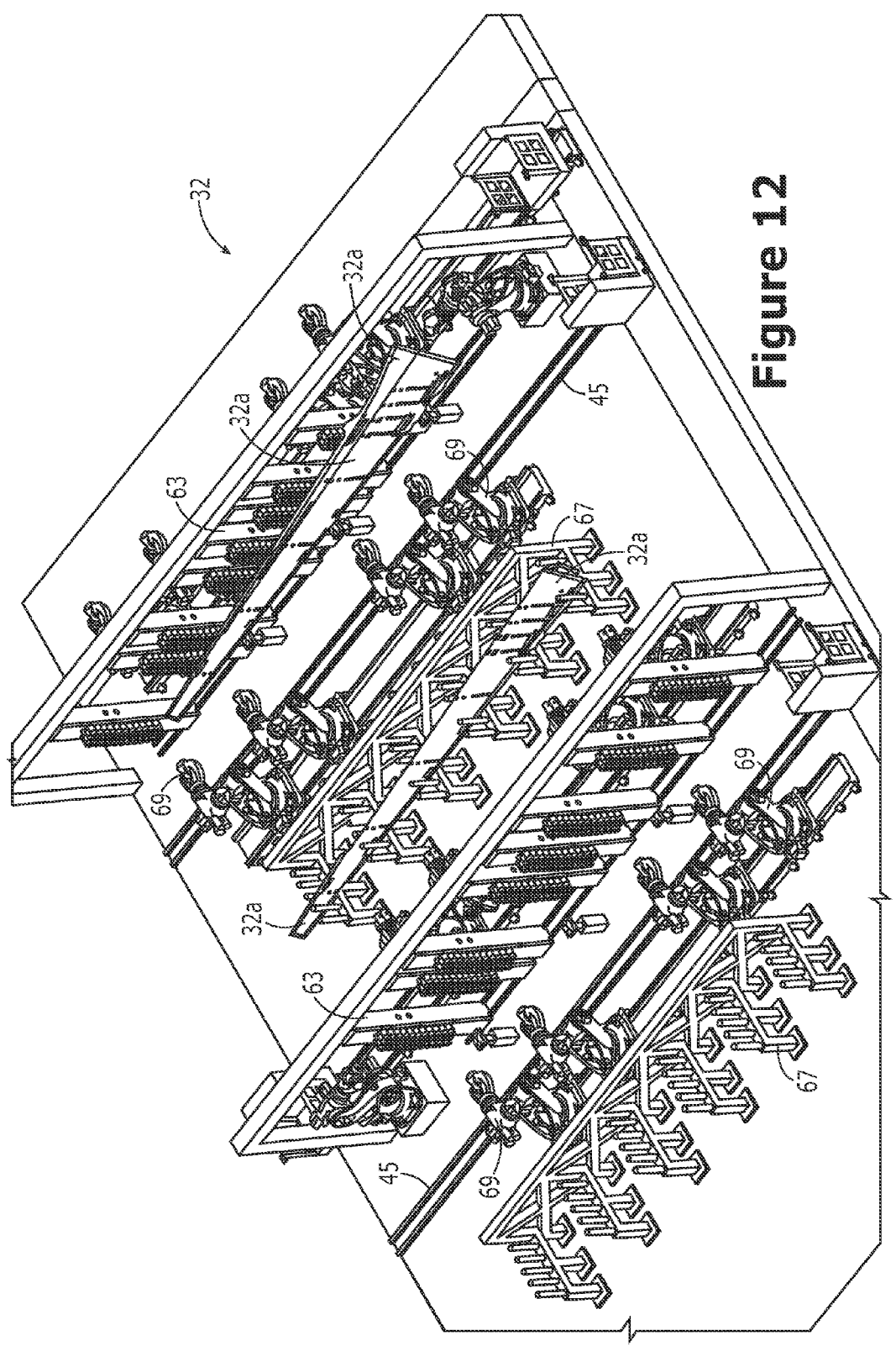
Figure 13:
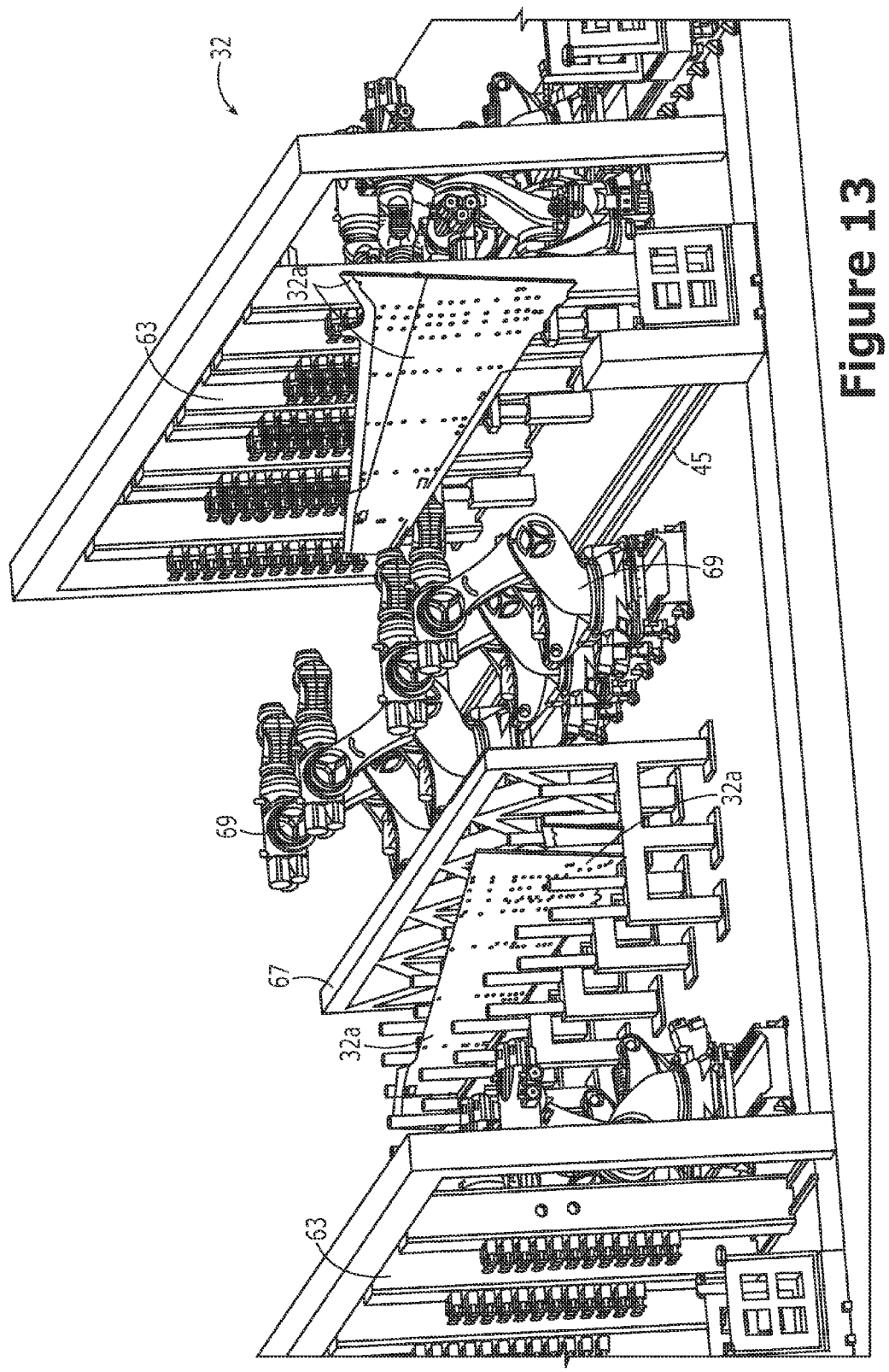
Figure 14:
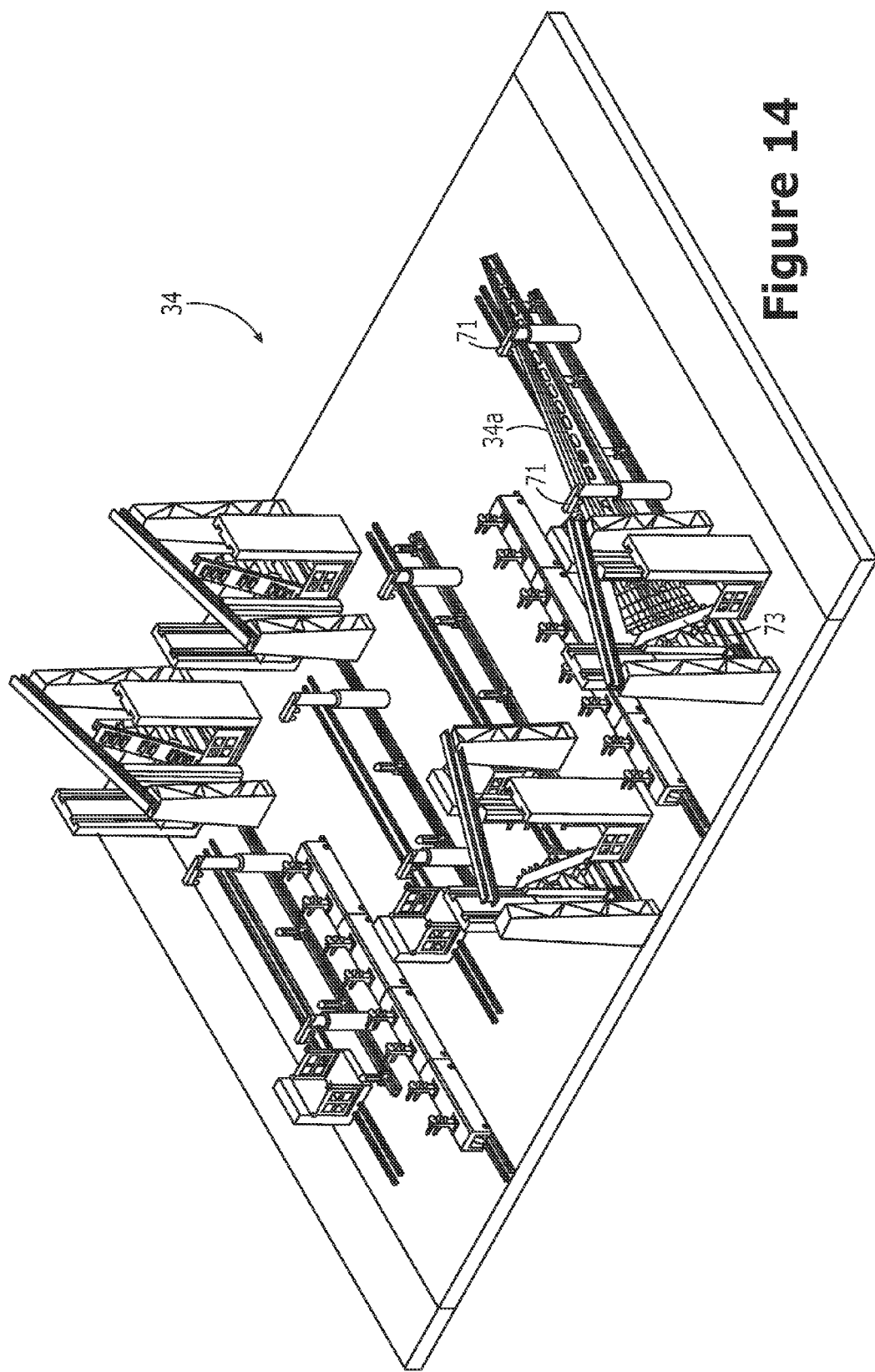

Having thus described certain embodiments of the present disclosure in general terms, reference will now be made to the accompanying drawings, which are not necessarily drawn to scale, and wherein:

FIG. 1 is a flow chart illustrating operations performed in accordance with an example embodiment of the present disclosure;

FIG. 2 is a perspective view of a system in accordance with one example embodiment of the present disclosure;

FIGS. 3A-3D are perspective views of a staging cell in accordance with one example embodiment of the present disclosure;

FIG. 4 is another perspective view of a staging cell in accordance with one example embodiment of the present disclosure;

FIG. 5 is a perspective view of a tacking cell in accordance with one example embodiment of the present disclosure;

FIG. 6 is another perspective view of the tacking cell of FIG. 5;

FIG. 7 is a perspective view of a pedestal of the tacking cell of one embodiment of the present disclosure;

FIG. 8 is a perspective view of a riveting cell in accordance with one example of the present disclosure;

FIG. 9 is another perspective view of the riveting cell of FIG. 8;

FIG. 10A is a perspective view of a portion of an overhead positioning system utilized in accordance with one embodiment of the present disclosure;

FIG. 10B is a perspective view of a vice jaw of an overhead positioning system of one embodiment of the present disclosure;

FIG. 11 is perspective view of a splicing cell in accordance with one embodiment of the present disclosure;

FIG. 12 is another perspective view of a portion of a splicing cell in accordance with one embodiment of the present disclosure;

FIG. 13 is yet another perspective view of a splicing cell in accordance with one embodiment of the present disclosure;

FIG. 14 is a perspective view of a side of body cell in accordance with one embodiment of the present disclosure; and FIG. 15 is another perspective view of a side of body cell in accordance with one embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

As shown in FIGS. 1 and 2, the system of one embodiment includes a plurality of sequential operational cells with different manufacturing operations being performed within each cell. The cells are arranged in sequence such that a workpiece moves from a first cell, such as a staging cell 20, to the last cell, such as a side of body cell 34, in order to allow a wing panel to be fabricated. The upper and lower wing panels may then be assembled to form a wing box. As described below the wing skin planks and the resulting wing panels are generally moved through the assembly process, such as from cell to cell, by an automated material transport system, such as an overhead positioning system. Other components, such as stringers, may also be delivered to the various cells upon carts that are automated so as to limit human involvement. As illustrated in FIG. 2, the system may include two or more buffers 24, 30 in which partially assembled workpieces are maintained, stored or the like while awaiting entry into the next cell in the process. By including one or more buffers, the operations performed by each cell may occur at slightly different rates without allowing the rate of operation of a subsequent cell to limit the rate of operation of a prior cell, while still permitting the workpieces to move smoothly through the overall process. Each cell will now be described in turn.

In the initial cell, that is, staging cell 20, the skins and stringers are received and prepared for assembly. See block 10 of FIG. 1 and FIGS. 3A-3D. In the staging cell 20, the skin planks 19 may arrive on a staging cart 42, while the stringers 21 may arrive on a staging cart 40. The skin planks 19 may be loaded onto an automated material handling system, hereinafter described as an overhead positioning system, e.g., a monorail system (not shown), that engages the skin planks and carries the skin planks to successive cells in an automated manner. As shown, the staging cart 42 may include one or more cutouts that permit the automated material handling system to access and engage the skin planks. The stringers may be moved from the staging cart 40 to a reconfigurable smart cart, two of which are shown at 44. In the illustrated embodiment, the reconfigurable stringer smart carts 44 are shown to be disposed on tracks to direct the reconfigurable stringer smart carts to the next cell, that is, to the tacking cell 22. However, the reconfigurable stringer smart carts may be directed to the tacking cell 22 in other manners. In one embodiment, for example, the reconfigurable stringer smart carts 44 may be an automatically guided vehicle (AGV) that is automatically guided from the staging cell 20 to the tacking cell 22. By utilizing a plurality of reconfigurable smart carts 44, one smart cart may be being loaded in the staging cell 20 prior to being sent to the tacking cell 22, while another smart cart is being unloaded in the tacking cell prior to being returned to the staging cell. FIG. 4 provides another illustration of a staging cell 20 and depicts the tracks 45 that direct the reconfigurable smart carts as well as a portion of the overhead positioning system 47.

The smart carts 44 may be reconfigurable, such as by including a plurality of positioning elements, e.g., gripper fingers, pogos, edge indexes, end gates and the like, so as to be configured to receive and securely hold the stringers 21. In this regard, the positioning elements may be configured to maintain and hold the stringers 21 in a predefined position, such as in a near net position so as to reduce the movement required by robots in a subsequent cell to interact with the stringers. In this regard, the stringers 21 may be staged upon the reconfigurable smart carts 44 so as to be in the correct orientation, that is, a predefined orientation, upon delivery to the tacking cell 22.

The skin planks 19 and the stringers 21 may then be moved to the tacking cell 22 via the overhead positioning system and the reconfigurable smart cart 44, respectively. Once received by the tacking cell 22, such as by movement of the reconfigurable stringer smart cart 44 into the tacking cell and movement of the skin planks along the overhead positioning system into the tacking cell, the skin planks may be delivered by the overhead positioning system to programmably reconfigurable tooling. As referenced herein, programmably reconfigurable tooling may be programmed so as to define a plurality of predefined positions, thereby accommodating a variety of different workpieces that are desirably held in different positions. The reconfigurable tooling may include pogos, edge indexes, inboard edge endgates and the like, which may be reconfigured in order to receive and securely hold the skin planks at a predefined position and orientation.

With reference to FIGS. 5 and 6, the reconfigurable tooling of the tacking cell 22 may include a plurality of pedestals 51. Each pedestal 51 may include one or more pogos 53 that may be controllably extended for engaging a skin plank 19 and establishing a predefined contour. As shown in FIG. 7, one or more the pedestals 51 may also include an edge index 61. The edge index 61 is vertically adjustable relative to the pedestal 51 and also includes an engagement member that may be controllably extended outwardly from the pedestal with the engagement member including finger clamps for engaging an edge of the skin plank 19 during the tacking operation. The reconfigurable tooling of the tacking cell 22 of FIG. 5 also includes a pair of opposed endgates 55 that may also include one or more repositionable pogos or other gripper fingers 57 for engaging the opposed ends of the skin plank 19 and for cooperating with the pogos or other gripper fingers 53 of the pedestals 51 for maintaining the skin plank in a desired position. The stringers 21 may then be picked from the reconfigurable stringer smart cart 44 by one or more robots 59, placed in a predefined location upon the skin planks 19 as defined, for example, by a digital database, and tacked, such as with a plurality of tack elements, to the skin plank. See block 12 of FIG. 1.

After having tacked the stringers 19 to the skin planks, the tacked planks may be moved, such as by the overhead positioning system, e.g., the monorail, following release by the programmably reconfigurable tooling of the tacking cell 24, to the riveting cell 26. See block 14 of FIG. 1 and the riveting cell 26 of FIG. 8. In the illustrated embodiment, the riveting cell 26 includes three riveting lines such that three tacked planks may be simultaneously riveted within the riveting cell at one time. Nonetheless, in an instance in which the riveting lines are already in use or the riveting cell 26 is otherwise unavailable, the stringers and skin planks may be temporarily stored in the buffer zone 24 positioned upstream of the riveting cell. The buffer zone 24 may provide a staging area for the tacked planks prior to entering the riveting cell 26 and may also permit the overhead positioning system, e.g., the monorail, to transition the tacked planks laterally so as to be aligned with a respective riveting line.

Each riveting line may include programmably reconfigurable tooling for receiving and engaging a tacked plank 26a. The reconfigurable tooling may include pogos, edge indexes, inboard edge endgates and the like, which may be reconfigured in order to receive and securely hold the tacked planks 26a at a predefined position and orientation, such as by gripping the edges of a tacked plank. As shown in FIGS. 8 and 9, for example, the reconfigurable tooling of each riveting line may include a plurality of inboard endgates 63 that may be controllably extended or retracted. Each inboard endgate may include a pair of finger clamps for engaging an edge of the tacked plank 26a and for maintaining the tacked plank in a desired position. The reconfigurable tooling of each riveting line may also include opposed endgates 65 for engaging opposed ends of the tacked plank 26a. As described above, the opposed endgates may include a plurality of pogos or other gripper fingers that are configured to be controllably extended and to engage the opposed ends of the tacked plank 26a while the tacked plank is maintained in the desired position. In this embodiment, one tacked plank 26a may be engaged by the reconfigurable tooling of each riveting line and maintained in a predefined position while a riveter 28, such as an O-frame riveter, moves along the tacked plank, such as by moving over the tacked plank with the tacked plank extending through the opening defined by the O-frame riveter so as to more permanently rivet the stringers to the skin plank. While the riveters 28 move along the tacked plank, the components of the reconfigurable tooling that engage the tacked plank 26a, such as the inboard endgates, may be automatically disengaged from the tacked plank and moved out of the way of the riveter, thereby allowing that portion of the tacked plank to be riveted while the tacked plank is held in position by the other components of the reconfigurable tooling. The components of the reconfigurable tooling may then be automatically returned to position in engagement with the tacked plank 26a once the riveter 28 has moved to a different position.

In the illustrated embodiment, each riveting line includes two O-frame riveters 28 in order to operate concurrently so as to more quickly process the tacked planks 26a. However, the riveting lines can include any number of riveters and different types of riveters, such as differently shaped riveters, in other embodiments. In the riveting cell 26, the riveters install a plurality of permanent fasteners and replace the tack elements with permanent fasteners, e.g., rivets. Following the completion of the riveting, the monorail or other overhead positioning system may engage the riveted plank and the programmably reconfigurable tooling may correspondingly release the riveted plank. In this regard, FIG. 10A illustrates the engagement of a riveted plank 32a by an overhead positioning system to provide for movement through the manufacturing system.

As shown in more detail in FIG. 10B, the overhead positioning system of the embodiment depicted in FIG. 10A includes a plurality of vice jaws 50 that engage the riveted plank 32a and that are configured to move in concert along the overhead positioning system, thereby transporting the riveted panel. As shown in FIG. 10B, the vice jaw 50 of one embodiment may include a track member 52 for engaging and moving along the monorail or other track of an overhead positioning system, as well as a pair of jaw member 54, 56 that may be adjustably positioned so as to snugly receive differently sized planks. Each jaw member 54, 56 may include one or more, e.g., a pair of, clamp members 58 that are configured to be adjustably positioned inwardly or outwardly along a respective jaw member. The jaw members 54, 56 and the clamp members 58 may be positioned so as to snugly receive the riveted plank 32a between the clamp members carried by respective jaw member. Additionally, the vice jaw 50 may include one or more extendable members 60, such as pogos, configured to adjustably extend into the jaw and to engage or contact a side surface of a riveted plank 32a so as to further secure the riveted plank within the jaw. Although described herein in conjunction with the engagement and transport of a riveted plank 32a, the vice jaws 50 of the overhead positioning system may be configured to engage other workpieces, such as skin planks, tacked planks, etc. Additionally, while one embodiment of an overhead positioning system and its vice jaws 50 is illustrated in FIGS. 10A and 10B and described above, the overhead positioning system may be differently configured in other embodiments.

The riveted planks may then be moved to the splicing cell 32. Although the splicing cell 32 may have a single line, the splicing cell may also include multiple lines, such as two splicing lines as shown in the illustrated embodiment of FIGS. 11-13. As such, a riveted plank 32a may be moved by the monorail or other overhead positioning system into the splicing cell 32. In the splicing cell 32, multiple riveted planks 32a may be spliced together with splice stringers. As such, the splicing cell 32 may include a storage rack 67 for holding the riveted planks 32a prior to the splicing operation until a sufficient number of riveted planks have been delivered to the splicing cell to permit the riveted planks to be spliced together. As such, the overhead positioning system may deliver the riveted planks 32a to the storage rack 67. The splicing cell 32 may also include one or more robots 69 that may engage the riveted planks 32a that are held by the storage rack 67 and move the riveted planks into alignment with programmably reconfigurable tooling once a sufficient number of riveted planks have been delivered to the splicing cell. The reconfigurable tooling will hold the riveted plank 32a in the appropriate position during processing within the respective splicing cell line. As described above, the reconfigurable tooling may include pogos, edge indexes, inboard edge endgates and the like, which may be reconfigured in order to receive and securely hold the riveted planks 32a at a predefined position and orientation, such as by gripping the edges of a riveted plank. In this embodiment, two or more riveted planks 32a, such as the number of riveted planks that comprise a wing panel, may be engaged and indexed by the reconfigurable tooling of each splicing line and maintained in a predefined position.

In the embodiment illustrated in FIGS. 11-13, the programmably reconfigurable tooling of the splicing cell 32 may include a plurality of vertical columns 63. In one embodiment, the vertical columns 63 are mounted upon tracks so as to be controllably translated lengthwise relative to the riveted plank 32a. The vertical columns 63 may carry one or more pogos, edge indexes, inboard edge endgates or the like that may be controllably positioned in order to engage the edges of the riveted plank 32a and to marinating the riveted plank in the desired position during the splicing operation. As described above in conjunction with other cells, the reconfigurable tooling of the splicing cell may also include opposed endgates for engaging opposed ends of the riveted plank 32a. As described above, the opposed endgates may include a plurality of pogos or other gripper fingers that are configured to be controllably extended and to engage the opposed ends of the riveted plank 32a while the riveted plank is maintained in the desired position.

In addition to receiving the riveted planks 32a, the splicing cell 32 also receives a plurality of splice stringers, such as a plurality of presealed splice stringers. For example the splicing cell 32 may receive a cart, such as a reconfigurable stringer smart cart 44, that carries a plurality of splice stringers to the splicing cell with the splice stringers positioned in a predefined orientation upon the cart. As before, the reconfigurable stringer smart cart 44 may move along tracks 45 or the reconfigurable stringer smart cart may be directed in another manner, such as by means of automated guidance. In one embodiment shown in FIG. 2, the reconfigurable stringer smart cart 44 may move into the splicing cell 32 from the side of body cell 34, thereby moving in the reverse direction to the flow of the processed planks through the system. One or more robots 69 may then pick a respective splice stringer from the cart 44 and may position the splice stringer an appropriate position relative to the riveted planks 32a that are positioned relative to one another by the programmably reconfigurable tooling. The splice stringers may then be installed, such as by being bolted to the riveted planks 32a by the robots 69 to the riveted planks, thereby integrating the riveted planks into a unitary wing panel. See block 16 of FIG. 1. By way of example, FIGS. 11-13 illustrate a splice line of a splicing cell 32 with one or more robots 69 operating so as to attach splice stringers to the riveted planks 32a.

In an alternative embodiment, a riveted plank may be suspended from the monorail or other overhead positioning system in alignment with a desired position within the splicing cell 32, such as in alignment with the programmably reconfigurable tooling. The splice stringer may be carried by a smart cart 44 and parked beneath the riveted plank. The plank may then be lowered into alignment with the splice stringer, such as by lowering the riveted plank from the monorail or other overhead positioning system. The riveted plank and the splice stringer may then be held in position, such as by reconfigurable tooling and/or a robot. After utilizing a robot to trace the edge of the riveted plank and the splice stringers so as to identify their relative location, a bolter, such as a C-frame bolter, may tack the splice stringer and the riveted plank together. As opposed to tracing the edge of the riveted plank and the splice stringer so as to determine their relative locations, the location of a prior splice stringer may be utilized in order to appropriately locate the next splice stringer with respect to the riveted planks.

In another embodiment, the splice stringers may be delivered by a smart cart 44 to the splicing cell 32 and the riveted planks may be delivered by the monorail or other overhead positioning system to the programmably reconfigurable tooling which is configured engage one or more riveted planks and to hold the riveted plank(s) in a predefined position. A robot may then engage a splice stringer and place the splice stringer relative to the riveted plank. A second robot may then install a fastener so as to fasten the splice stringer to the riveted plank(s). These two robots may then move in concert so as to install the fasteners. Other robots may move ahead of the robots that are installing the fasteners in order to determine relative location of the splice stringer with respect to the riveted plank(s) and to reposition the splice stringer as desired. This process may be repeated for each splice stringer that is attached to the riveted plank(s).

After being appropriately spliced, the spliced panel 34a may be moved to a side of body cell 34 as shown in block 18 of FIG. 1 and in FIGS. 14 and 15. The side of body cell 34 may also include one or more lines. In an instance in which the side of body cell 34 includes a plurality of lines, multiple spliced panels 34a may be processed at one time with each line operating on a respective spliced panel. In the side of body cell 34, the spliced panel 34a may be delivered by a monorail or other overhead positioning system to a fixture or other tooling that maintains the spliced panel in a predefined position and orientation. The side of body (SoB) chord may then be installed by a robot and one or more paddle fittings may also be installed by a robot along with any required shims to as to complete the assembly of the wing panel. In this regard, the fixture or other tooling may cause the desired contour to be provided to the inboard end of the spliced panel with the side of body chord then being installed at the inboard end of the spliced panel 34a. In one embodiment, one or more robots install the side of body chord and any required paddle fittings with a plurality of bolts that engage the properly contoured spliced panel 34a.

With reference to the embodiment of FIGS. 14 and 15, the side of body cell 34 may also include programmably reconfigurable tooling to hold the spliced panel 34a in a desired position. In this regard, the reconfigurable tooling of the side of body cell 34 may include one or more edge clamps 71 that may be adjustably positioned relative to the spliced panel 34a, such as by moving inwardly or outwardly along floor mounted rails and/or upwardly or downwardly along corresponding pedestals, so as to engage opposed edges of the spliced panel. The reconfigurable tooling of the side of body cell 34 may also include one or more endgates 73 for engaging an end of the spliced panel 34a. As described above, the endgate may include a plurality of pogos or other gripper fingers that are configured to be controllably extended and to engage the end of the spliced panel 34a while the spliced panel is maintained in the desired position, thereby providing contour to the spliced panel during attachment of the side of body chord, such as to the inboard end of the spliced panel.

The resulting wing panel may then exit the side of body cell 34 and be assembled with another wing panel, such as by assembling upper and lower wing panels, so as to form a wing box. By automating the assembly process and by utilizing operationally separate cells for performing distinct manufacturing operations, the system and method of one embodiment may manufacture wing panels and, in turn, wing boxes more rapidly and more efficiently.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A system for automated manufacture of aircraft wing panels comprising:
   a tacking cell configured to tack one or more stringers to a skin plank;
   a riveting cell configured to receive a tacked plank from the tacking cell and to rivet the one or more stringers to the tacked plank;
   a splicing cell configured to receive a plurality of riveted planks from the riveting cell and to attach one or more splice stringers to the plurality of riveted planks;
   a side of body cell configured to receive a spliced panel from the splicing cell and to attach a side of body chord thereto to produce a wing panel;
   at least one reconfigurable cart configured to carry components of the aircraft wing panels between at least some of the cells including being configured to carry the one or more stringers to the tacking cell and the one or more splice stringers to the splicing cell, wherein the at least one reconfigurable cart comprises a plurality of positioning elements including one or more of a gripper finger, a pogo, an edge index or an end gate positioned so as to hold the components of the aircraft wing panels in a predefined position and in a predefined orientation upon delivery to a respective cell; and
   an overhead positioning system configured to carry components of the aircraft wing panels between at least some of the cells including being configured to move the skin plank to the tacking cell, the tacked plank to the riveting cell, the riveted plank to the splicing cell and the spliced panel to the side of body cell, wherein the overhead positioning system comprises a track extending between at least some of the cells and a plurality of vice jaws configured to engage both the track and the components of the aircraft wing panels,
   wherein each vice jaw comprises a track member configured to engage the track and a pair of adjustably positionable jaw members configured to engage the components of the aircraft wing panels, and wherein at least one jaw member comprises a pair of adjustably positionable clamp members configured to move along the respective jaw member to receive a riveted plank between the clamp members.

2. A system according to claim 1 further comprising a staging cell upstream of the riveting cell for receiving the one or more tacked planks and for providing the one or more tacked planks to the riveting cell.

3. A system according to claim 1 wherein the reconfigurable cart is configured to travel via rails.

4. A system according to claim 1 wherein the reconfigurable cart comprises an automated guided vehicle.

5. A system according to claim 1 wherein the overhead positioning system comprises a plurality of vice jaws having first and second jaw members with first and second clamp members, wherein at least one of the clamp members is adjustable.

6. A system according to claim 5 wherein each vice jaw further includes one or more extendible members that are configured to adjustably extend into the vice jaw.

7. A system according to claim 1 wherein at least one of the riveting cell, the splicing cell and the side of body cell comprises a plurality of lines to provide for parallel processing.

8. A system according to claim 1 wherein the tacking cell, the riveting cell and the splicing cell each include programmably reconfigurable tooling for maintaining the skin plank, the tacked plank and the riveted plank, respectively, in a predefined position.

9. A system according to claim 8 wherein the programmably reconfigurable tooling is configured to define a plurality of different positions so as to permit the skin plank, the tacked plank and the riveted plank to be maintained in different respective predefined positions.

10. A system according to claim 1 wherein the tacking cell, the riveting cell, the splicing cell and the side of body cell each include one or more robots.

11. A system according to claim 1 wherein the reconfigurable cart is configured to move through a portion of the system in a reverse direction to a flow of the skin plank, the tacked plank and the riveted plank through the system.

12. A system according to claim 1 wherein the riveting line comprises a plurality of riveting lines, and wherein the overhead positioning system is configured to transition the one or more tacked planks laterally within the staging cell so as to be aligned with a respective riveting line.

13. A system according to claim 1 wherein one of the tacking cell, the riveting cell, the splicing cell or the side of body cell is configured to operate at a different rate than another one of the tacking cell, the riveting cell, the splicing cell or the side of body cell.

14. A system according to claim 1 wherein the tacking cell comprises reconfigurable tooling configured to engage the skin plank and to establish a predefined contour.

15. A system according to claim 1 wherein the side of body cell comprises reconfigurable tooling configured to engage the spliced panel and to establish a predefined contour.

16. A system according to claim 15 wherein the side of body cell is configured to install one or more paddle fittings while the spliced panel is engaged so as to have the predefined contour.

17. A system according to claim 1 wherein at least one jaw member comprises one or more extendable members configured to adjustably extend into the respective jaw member.

* * * * *